H. H. GAGE.
LIQUID SOAP DISTRIBUTER.
APPLICATION FILED SEPT. 21, 1914.
1,186,181.
Patented June 6, 1916.
2 SHEETS—SHEET 1.
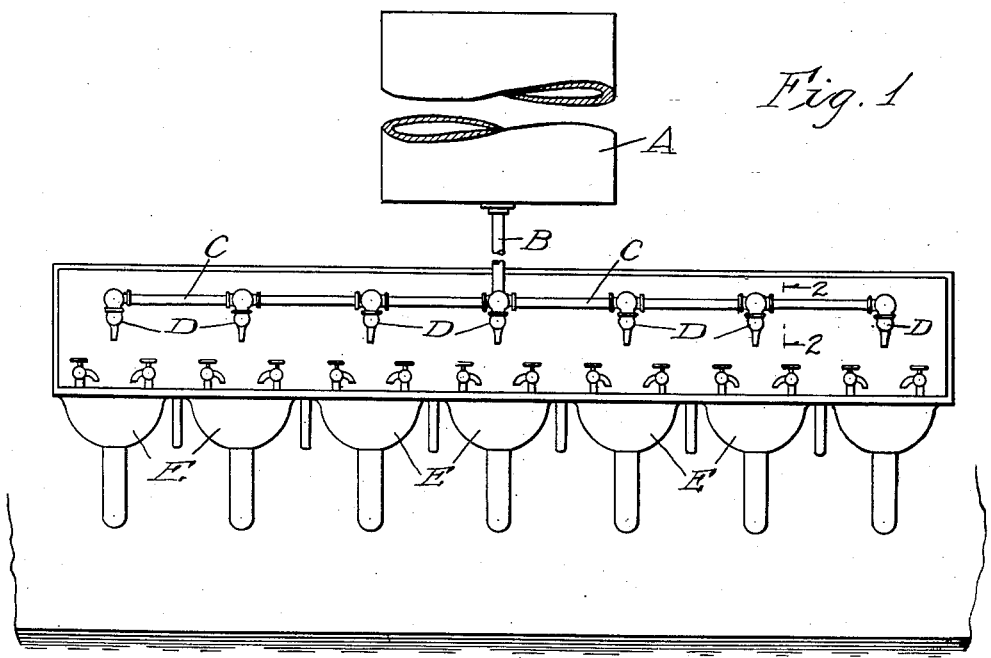
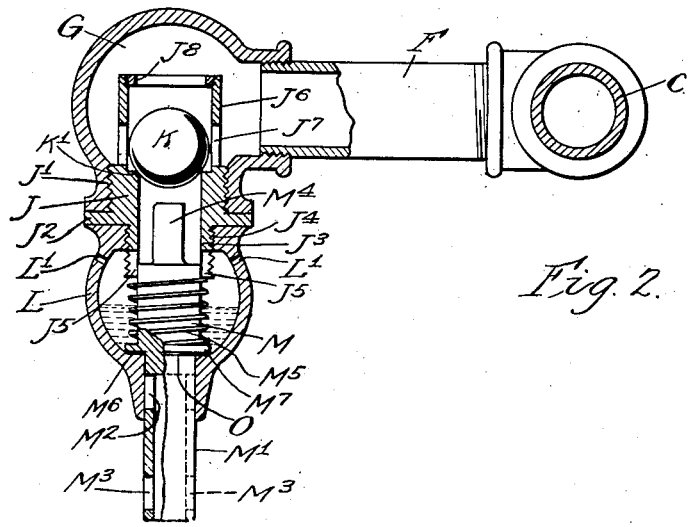
Witnesses:
Inventor.
Harry H. Gage.
by Parker & Carter
his Attys H. H. GAGE.
LIQUID SOAP DISTRIBUTER.
APPLICATION FILED SEPT. 21, 1914.
1,186,181.
Patented June 6, 1916.
2 SHEETS—SHEET 2.
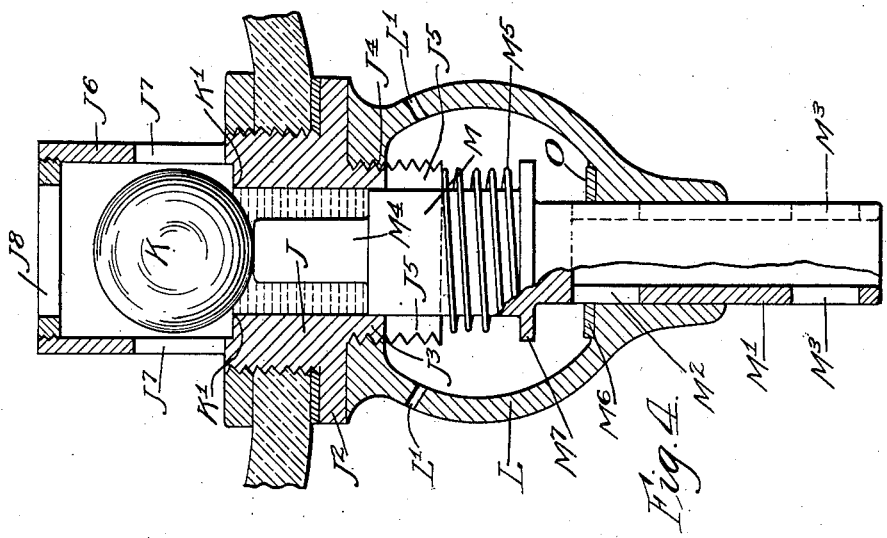
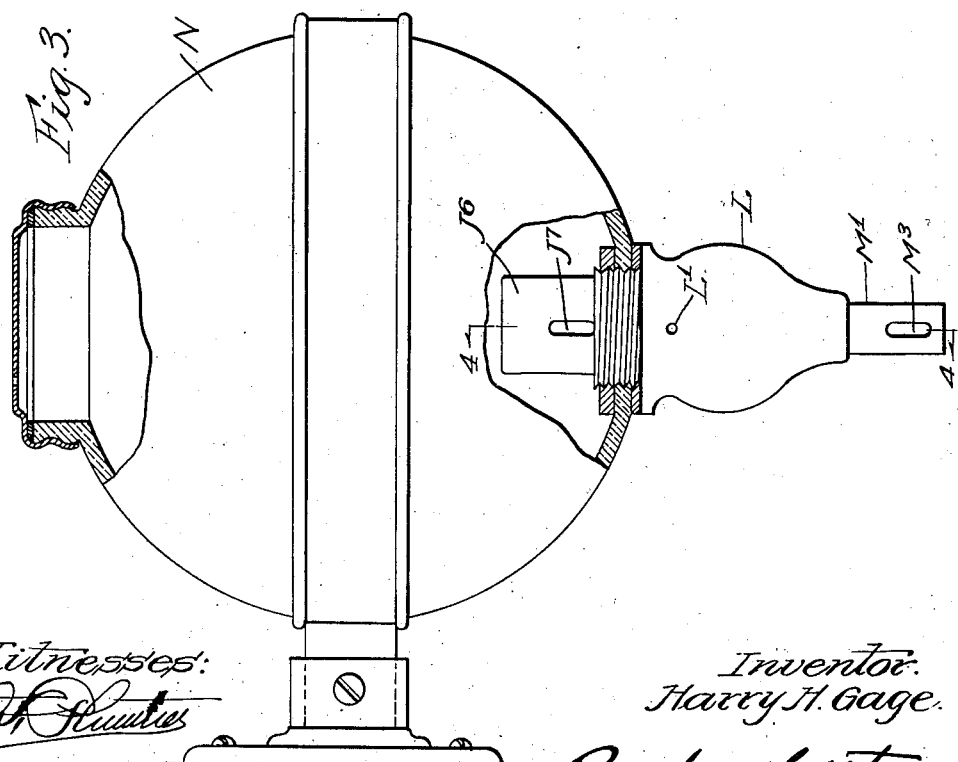
Witnesses:
Inventor:
Harry H. Gage.
by Parker & Barter
his Attys.

UNITED STATES PATENT OFFICE.

HARRY H. GAGE, OF CHICAGO, ILLINOIS.

LIQUID-SOAP DISTRIBUTER.

1,186,181.  Specification of Letters Patent.  Patented June 6, 1916.

Application filed September 21, 1914. Serial No. 862,637.

*To all whom it may concern:*

Be it known that I, HARRY H. GAGE, a citizen of the United States, residing at Chicago, in the county of Cook and State of Illinois, have invented a certain new and useful Improvement in Liquid-Soap Distributers, of which the following is a specification.

My invention relates to means and apparatus for distributing liquid soap.

It is illustrated in the accompanying drawing, wherein—

Figure 1 is a diagrammatic plan view of a soap distribution apparatus installed according to my invention. Fig. 2 is a cross section showing certain details. Fig. 3 is a cross section showing the valve in connection with an individual tank. Fig. 4 is a section on the line 4—4 of Fig. 3 showing the moving parts in a raised position.

Like parts are indicated by the same letter in all the figures.

A is a storage tank, B a main distribution pipe, and C a line pipe connected therewith. B is a distribution device, and E a wash bowl close to which the same is mounted.

F is a connection pipe from the line pipe to the distribution device. Each distribution device consists of the small receiving receptacle G connected with the pipe F, and preferably shaped substantially as shown. It may be no more than a pipe elbow. It will be understood that the tank A is elevated or placed so as to keep the pipes, the receptacles G, G, always substantially full of liquid soap.

J is a cylinder screw-threaded at $J^1$ to be received into a screw-threaded aperture in the receiving receptacle G. The cylinder is preferably provided with a flange $J^2$ in opposition to a similar flange about the aperture in the receiving receptacle. The cylinder has a downwardly projecting portion $J^3$ screw-threaded at $J^4$ and slotted at $J^5$. It also has an upwardly projecting portion or cage $J^6$ slotted at $J^7$, and provided with an annular screw cap $J^8$.

K is a ball valve within the cage $J^6$. It is adapted to be seated on the annular edge $K^1$ as indicated.

L is a discharge receptacle screw-threaded at its upper end to engage the screw-thread $J^3$ on the downwardly projecting portion of the cylinder J. This discharge receptacle has one or more air outlets $L^1$ and is preferably shaped so as to engage when in position the lower portion of the flange $J^2$. Within the cylinder J and the discharge receptacle L is the valve stem M, having the lower tubular portion $M^1$ with slotted openings $M^2$, $M^3$. Upwardly projecting from the stem M is the part $M^4$ adapted to take against the lower side of the ball valve K. The valve stem slides past the slots $J^5$, and is held in its downward position by the spring $M^5$ against the seat $M^6$ formed within the discharge receptacle in opposition to the valve portion $M^7$ on the valve stem.

I have shown in Fig. 3 the valve cage and discharge receptacle as applied to or associated with a small storage tank N, the latter being secured in any desired manner, and provided with means for filling it at the top. I prefer to have a yielding valve seat O placed between the inner wall of the discharge receptacle and the flange on the valve stem.

The size and proportions of the parts are such that when the parts are in the position shown in Fig. 2, the supply from the receiving receptacle G is cut off by the ball valve, and the escape from the discharge receptacle is cut off by the closed valve about the valve stem. The ball valve is held in position by its own weight, and by the pressure of fluid back of it, and the valve stem is seated by the weight of the valve stem and the reinforcing action of the spring. When the valve stem is pushed upwardly by the end, the first action is to cause the valve stem to close the slots $J^5$ thus shutting off the central measuring chamber from the discharge to the lower discharge chamber. A further upward pressure against the spring will open the valve about the lower part of the stem and permit the measured quantity of fluid to pass out through the slots $M^2$, $M^3$ downwardly through the cylindrical portion of the stem $M^1$, and a further upward motion of the stem will lift the ball valve from its seat and permit liquid to flow past the ball valve into the chamber about the upper end of the stem. When the stem is released its first downward action will release the ball valve and permit it to engage its seat. A further descent of the stem will open the slots $J^5$ permitting the charge about the upper end of the stem to flow into the discharge receptacle, but it cannot flow therefrom because the valve in the bottom of such receptacle is immediately closed and the volume of this receptacle is so much larger than the volume of the chamber about the upper end of the stem that any liquid will flow out of the air outlets L¹. The parts must be so proportioned that the action above suggested will be carried out.

The size, shape and proportion of the several parts may of course be greatly altered, or some of them changed, and others substituted therefor without departing from the spirit of my invention, and I do not wish, therefore, to be limited to the exact arrangement illustrated.

The use and operation of my invention are as follows:—Assuming that the soap distribution apparatus has been set up as indicated diagrammatically in Fig. 1, the tank A being at a higher elevation than the soap distributing receptacles, it is obvious that all of the receiving receptacles will be kept all the time full of liquid soap. Since the soap is to be delivered in successive charges, and not in a continuous stream, it is necessary that there should be a discharge receptacle for each receiving receptacle with connection between the two, so that the discharge receptacle is filled with successive charges of soft soap from the receiving receptacle associated with it. The discharge receptacle, however, must have an air outlet, so that the soap can flow into and out of it, and the various valves must be arranged and seated so as to minimize the danger of leakage, for if there were leakage from below the ball valve K into the distributing receptacle, the air outlet therefrom would permit the soap to overflow and waste. My distribution, therefore, in its best form, embraces a single or common tank, a series of liquid distributing devices, a connection from each to the tank, and in each liquid distributing device, a receiving receptacle, a discharge receptacle and connections between the two whereby the discharge receptacle is successively filled, and an air outlet from the discharge receptacle which permits such operation. The arrangement is such that the valve outlet from the receiving to the discharge receptacle is always closed positively when the passage from beneath such valve to the discharge receptacle is open. In the arrangement which I have here shown, provision is made for thus keeping the valve closed both by the weight of the ball and the pressure of the fluid liquid back of it. The parts are shaped and proportioned so that the valve stem cannot unseat the supply valve until the passageway thence to the discharge receptacle is closed. At this moment, of course, the liquid in the discharge receptacle is freely discharged to the lower tubular exit M¹ because of the air inlets L¹ L¹. The spiral spring and gravity in the arrangement here shown return the parts to their normal positions. Of course, the valve portion may be attached as suggested, to an individual storage tank, which is not constantly filled with liquid. In this case, the ball valve is held on its seat by its own gravity. On the other hand, a system may consist of a single storage tank in elevated position, so as to keep the receiving receptacle full of soap practically all the time.

For cleaning and adjusting purposes the discharge receptacle with the valve stem may be removed by unscrewing the receptacle from the flange of the connection, and the connection itself with the ball valve, and surrounding the cage, may in like manner be removed by unscrewing it from the receiving receptacle, and these parts may be assembled as shown with or without the shell of the receiving receptacle in complete condition, so that they can be shipped or applied without the parts becoming loosely separated.

I claim:

1. In a liquid measuring valve three separate communicating chambers arranged in series, a ball valve located in the first one and normally adapted to separate it from the second, a discharge port leading from the third, a two part piston valve slidably mounted in said port and in the second chamber, and means responsive to the upward movement of the piston valve for unseating the valve in the first chamber.

2. In a liquid measuring valve three separate communicating chambers arranged in series, a ball valve located in the first one and normally adapted to separate it from the second, a discharge port leading from the third, a two part piston valve slidably mounted in said port and in the second chamber, and means responsive to the upward movement of the piston valve for unseating the valve in the first chamber, and yielding means for normally holding the piston valve in a downward position, to close the discharge port and permit free passage from the second to the third chamber.

3. A liquid discharge and measuring device comprising a storage reservoir, a receiving chamber, a connection between them, a discharge chamber, a connection between it and the receiving chamber, a piston valve free to reciprocate, located partially in the receiving and partially in the discharging chamber and in the connection between them, a separate valve controlled by such first mentioned valve located within the receiving chamber and adapted normally to separate it from the connection leading to the discharge chamber, and means carried by the first mentioned valve and normally preventing discharge from the discharge chamber adapted when the first mentioned valve closes and opens the second valve to permit discharge from the chamber.

4. The combination with a central storage reservoir, a supply pipe in communication therewith, a series of relatively small supply chambers each in communication with such supply pipe, an outlet from each such supply chamber and a valve normally closed controlling such outlet, a measuring and controlling device in communication with such outlet, and means responsive to the manipulation of such measuring and controlling device for opening the valve to permit discharge of material from each such chamber into each such device, and for measuring and controlling and discharging a predetermined amount of liquid from each such measuring device when it is manipulated independent of the remaining devices, such device being arranged to permit only one discharge of a fixed predetermined quantity of material at each manipulation.

In testimony whereof, I affix my signature in the presence of two witnesses this 18th day of September 1914.

HARRY H. GAGE.

Witnesses:
 BESSIE S. RICE,
 MINNIE M. LINDENAU.